June 2, 1959

G. B. ENTZ 2,888,916

MACHINES FOR CUTTING OR SPLITTING STONES
AND SIMILAR MASONRY MATERIAL

Filed Jan. 2, 1957

INVENTOR
Gerhard B. Entz

BY
ATTORNEYS

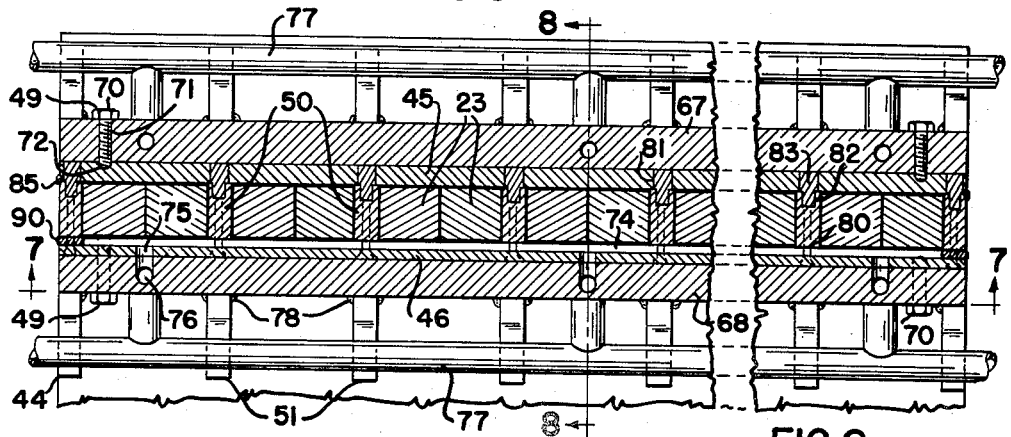
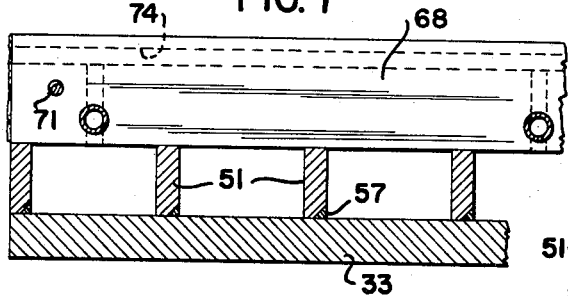
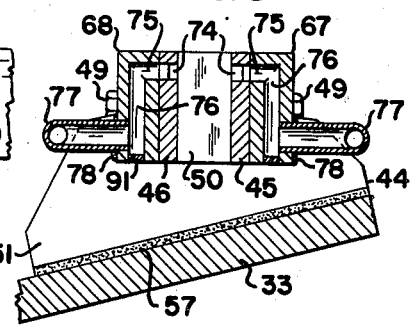
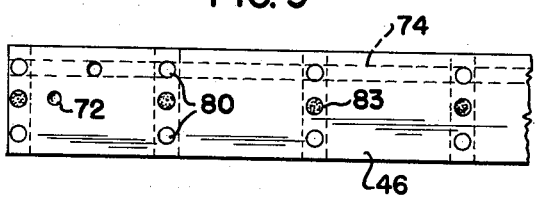
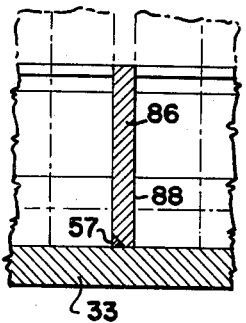
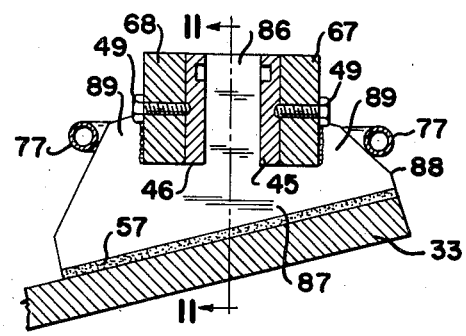
INVENTOR
Gerhard B. Entz

United States Patent Office

2,888,916
Patented June 2, 1959

2,888,916

MACHINES FOR CUTTING OR SPLITTING STONES AND SIMILAR MASONRY MATERIAL

Gerhard B. Entz, Oklahoma City, Okla.

Application January 2, 1957, Serial No. 632,237

5 Claims. (Cl. 125—23)

This invention relates to machines for cutting or splitting stones and similar masonry material, such as concrete blocks, in which the machine has upper and lower jaws between which the work is disposed and at least one of the jaws is bodily movable toward the other for the cutting or splitting operation. For best results in accomplishing this cutting or splitting inwardly of predetermined imaginary lines on the top and bottom faces of the work pieces, it has been the practice to provide each jaw with a plurality of side-by-side, independently adjustable chisels. These reciprocable chisels are set according to the contours of the faces of the work piece along these imaginary lines and then the power stroke of the machine accomplishes the cutting or splitting of the work piece. Examples of such machines are shown in the patents to Johanning 2,152,193 and Entz 2,762,359 on stone cutting machines and in my pending applications Serial No. 524,476, filed July 26, 1955 for machines for cutting or splitting concrete blocks and the like, and Serial No. 628,150, filed Dec. 13, 1956 for machines for cutting or splitting stones, blocks and similar masonry material.

Heretofore, in practice, the shanks of the chisels of each jaw reciprocate in holes in horizontal chisel bars permanently fixed to the jaw member, as in the aforesaid Patent 2,152,193, or between parallel horizontal chisel bars and between transverse chisel spacers arranged between the bars so as to separate the row of chisel shanks in pairs, such bars and spacers being permanently fixed to the jaw member as in the aforesaid Patent 2,762,359. It has also been found desirable to have a loose fit between the chisel shanks and their respective chisel bars and spacers as brought out in Patent 2,762,359. This is especially desirable with respect to the lower jaw arrangement where, in operation, such unwanted material as small stone fragments, sand, dirt, etc., may find its way to the zones of the chisel shanks and provision may be made for washing away such unwanted material. There may also be an advantage in providing such loose fit in that the effect is similar to holding of the chisel in the hand of a stone cutter while delivering a blow to the chisel by use of a hammer, the chisel has a very limited freedom of movement to adjust itself to the contour of the stone surface it engages and perhaps move very slightly to one side or the other of a very hard grain of the stone and thus prevent crumbling at the surface of the work piece.

However this loose fit results in wear of the surfaces of the horizontal bars which confront the chisel shanks and it is one of the objects of this invention to permit ready removal and replacement of the chisel bars, either in companion pairs or individually.

Another object is to facilitate manufacture of these chisel guiding assemblies of the machine jaws, thereby reducing the cost of manufacture, and permitting of a more rigid connection of the parts which are subjected to forces likely to displace or fracture them if they are not assembled in a manner to distribute the forces coming upon parts, one to another.

Other objects will appear in the following detailed description of two embodiments of the present invention, taken in connection with the accompanying drawings, forming a part of this specification and in which drawings:

Fig. 6 is an enlarged fragmentary sectional view on the line 6—6 of Fig. 1.

Figs. 7 and 8 are sectional views on the lines 7—7 and 8—8, respectively of Fig. 6.

Figure 3:
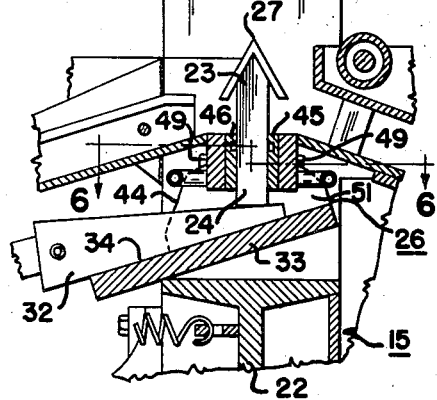
Fig. 3 is a fragmentary view in side elevation of a guide for the chisels of the upper jaw of the machine, detached from the jaw portions which normally carries it.

Fig. 9 is a view similar to Fig. 3 but showing a guide for the chisels of the lower jaw of the machine.

Fig. 10 is a view similar to Fig. 8, but showing a modified form of the invention.

Fig. 11 is a sectional view on the line 11—11 of Fig. 10.

The present invention is disclosed, by way of example, applied to a machine of the type shown in my aforesaid application Serial No. 628,150, filed December 13, 1956 comprising upright frame 12 which supports an upper jaw 14 and a lower companion jaw 15. It is immaterial insofar as this invention is concerned whether the lower jaw is movable toward the upper jaw, or the latter is movable toward the former, or both are movable toward each other for the cutting operation. In the example shown, the upper jaw 14 includes a reaction cross member 16, a row of side-by-side, independently reciprocable chisels 17 having shanks 18 provided with longitudinally extending slots 21 in one face of each, and means 19 for supporting the chisels 17 with their cutting edges 20 lowermost, while the lower jaw includes a reaction cross member 22, a row of side-by-side, independently reciprocable chisels 23 having shanks 25 and means 26 for supporting the chisels 23 with their cutting edges 27 uppermost as is common in the art. By way of example, each of the chisels 17 each has associated with it a wedge 28 adapted to engage an abutment or wedge plate 29, common to all of the wedges, having a lower face 30 in angular relation to the axes of chisel shanks 18 so that by movement of the wedge of any particular chisel, the latter may be limited in its movement toward the plate 29 according to the contour of the upper surface of the work piece which the cutting edge 20 engages during the cutting operation. Likewise, in the example shown, the chisels 23 each has associated with it a wedge 32 adapted to engage an abutment or wedge plate 33, common to all of the wedges, having an upper face 34 in angular relation to the axes of chisels 23 so that movement of the wedge will set its particular chisel in a fixed position with respect to the jaw with its cutting edge 27 in firm contact with the lower surface of the work piece, according to the contour thereof. Means for operating the wedges 28 and 32, not shown in the drawings are illustrated in the aforesaid patents and applications, so that a detailed illustration and description is not required in this application.

Figure 1:
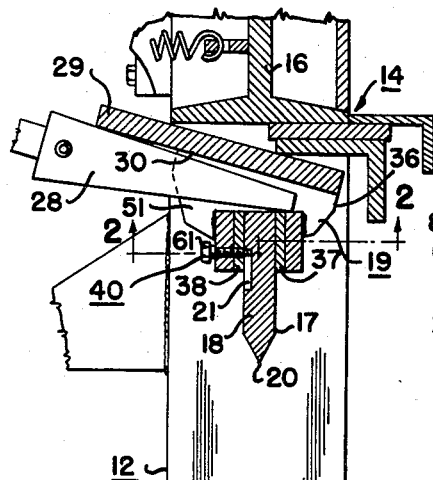
Fig. 1 is a vertical sectional view transversely of the companion jaws and adjacent parts of a machine of the type shown in the aforesaid application Serial No. 628,150.
Figure 2:
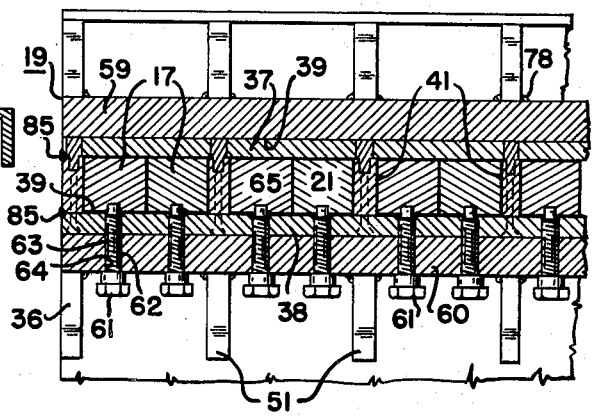
Fig. 2 is an enlarged horizontal, fragmentary sectional view on the line 2—2 of Fig. 1.

The means 19 comprises a cradle-like support 36, forming an integral part of the upper jaw, a pair of spaced, parallel chisel guide bars 37 and 38 detachably carried by the support 36 and extending longitudinally of the row of chisels 17 with bearing faces 39 of the bars confronting the opposite sides of the chisel shanks 18 and means 40 detachably connecting the chisel guide bars 37 and 38 to the support 36. In the example of the invention shown in Figs. 1-2 there are provided upright spacer plates 41 disposed in spaced relation longitudinally of and between the bars 37 and 38 and secured thereto preferably in a manner to be subsequently set forth. The purpose of these plates is to segregate some of the chisels 17 from others, preferably in pairs, as shown in Fig. 2 since it has been found desirable to have the loose fit between the chisel shanks and their respective chisel guide bars, as previously pointed out, and this segregation of the chisels in pairs prevents all from crowding toward one side or the other of the machine or forming appreciable gaps between the cutting edges of some of the adjacent chisels.

The means 26 comprises a cradle-like support 44 forming an integral part of the lower jaw, a pair of spaced parallel chisel guide bars 45 and 46 detachably carried by the support 44 and extending longitudinally of the row of chisels 23 with bearing faces 48 of the bars confronting the opposite sides of the chisel shanks 24, and means 49 detachably connecting the chisel guide bars 45 and 46 to the support 44. In the form of invention disclosed in Figs. 1, 6, 7 and 8 there are provided spacer plates 50 located and for the purpose above set forth in connection with the spacer plates 41.

Figure 4:
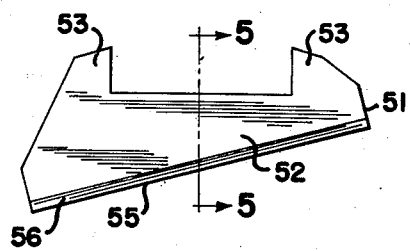
Fig. 4 is a view in side elevation of a member of a jaw of the machine, either upper or lower jaw, provided to aid in supporting the unit shown in Fig. 3.
Figure 5:
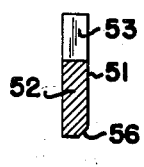
Fig. 5 is a vertical sectional view on the line 5—5 of Fig. 4.

The supports 36 and 44 preferably have some features in common, such as the provision of substantially U-shaped plates 51 shown more in detail in Figs. 4 and 5 which may be fabricated from sheet or flat bar material or may be the product of the same mold. Each plate 51 has a bight portion 52 and stems 53 extending therefrom, the bight portion 52 having an outer diagonal edge portion 55 which is chamfered as at 56, whereby the plate 51 may be secured, as by weld 57 to its respective abutment or wedge plate 30 or 33 as the case may be, in side-by-side spaced apart relationship longitudinally of the jaw, and between which pairs of the wedges 28 or 32, as the case may be, ride in operative relation with respect to their companion chisels.

The support 36 also preferably includes spaced apart parallel backing bars 59 and 60 secured to the confronting faces of the stems 53 of the plates 51, bridging the spaces between these plates, and against which the chisel guide bars 37 and 38, respectively, engage.

The means 40 may comprise a plurality of bolts 61, one for each chisel 17—the shanks 62 of the bolts being in screw threaded engagement with aligned holes 63 and 64 in the bars 38 and 60, and the bolts 61 may each be provided with a reduced unthreaded inner end 65 extending loosely into the slot 21 of its respective chisel 17 to prevent it from dropping out of the support 36.

The support 44, in addition to the plates 51 preferably includes spaced apart parallel backing bars 67 and 68 secured to the confronting faces of the stems 53 of the plates 51, bridging the spaces between these plates, and against which the chisel guide bars 45 and 46, respectively, engage.

The means 49 may comprise bolts 70, the shanks 71 of which extend through screw threaded openings 72 in the backing bars 67 and 68, the ends of the bolts being received in sockets 73 in the outer faces of such bars.

In the example shown the bars 45, 46, 67 and 68 are fabricated to permit delivery of a lubricating-wash liquid to shanks 24 of chisels 23 and with this end in view, the bars 45 and 46 are each provided with a longitudinally extending groove 74 open at its face confronting its companion chisel guide bar for distributing the liquid to the chisel shanks, and lateral ports 75 open to the grooves and the bars 67 and 68 are provided with ports 76 open to the grooves 74 for delivery of the liquid thereto. The liquid may be delivered to the ports 75 by a manifold piping 77 in a manner similar to that in my aforesaid Patent 2,762,359.

The bars 59, 60, 67 and 68 may be secured to the plates 51 by welds 78. The spacer plates 41 and 50 may be secured to their respective chisel guide bars by transverse rivets 80. If desired, in order to more securely fix the spacer plates to their respective chisel guide bars, the latter may be drilled to provide transverse holes 81 with aligned countersinks 82 in the spacer plates, which are filled with welding material 83. This imparts additional strength and prevents shearing of the shanks of rivets 80. Outer lines of welds 85 may also be provided joining the outermost spacer plates 41 and 50 to their respective chisel guide bars 38 and 39 or 45 and 46, respectively, as the case may be.

The modified form of invention shown in Figs. 10 and 11 is similar to that previously described, but contemplates omitting the spacer plates 41 and 50 secured to their respective chisel guide bars 38 and 39, and 45 and 46, respectively and instead, forming a spacer plate portion 86 rigid with the bight portion 87 of a U-shaped plate 88 having stems 89 corresponding to those of plate 51. The spacer plate portion 86 may be formed integral with the bight portion 87 in the fabricating of the plate 88 or in the molding thereof. The manner of securing the backing bars 59 and 60 or 67 and 68 as the case may be, to the plates 88, and the separate chisel guide bars 38 and 39 or 67 and 68, as the case may be, to their respective backing bars, may be the same as previously described.

In the fabrication of the chisel guide bars, the grooves 74 may be milled in the face of its respective bar, from end to end, and the ends of the groove filled with a welding material 90. The ports 76 may be formed by drilling operations from the faces of the bar and any unwanted opening closed by welding material 91.

It is believed the advantages of these improvements will be clear from the foregoing description. The assembly is rendered very sturdy; the production of the chisel guide bars is greatly facilitated with extreme accuracy; and repair or replacement of worn parts may readily be accomplished, in most instances without the necessity of breaking or removing any welds.

I claim:

1. In a masonry material cutting machine of the type including a jaw and a row of side-by-side independently reciprocable chisels having shanks, the improvement which comprises; a cradle-like support forming an integral part of the jaw, a pair of spaced, parallel chisel guide bars detachably carried by said support and extending longitudinally of the row of chisels with bearing faces of the bars confronting opposite sides of the chisel shanks, and means detachably connecting said bars to said support, said cradle-like support comprising a plurality of substantially U-shaped plates disposed in side-by-side spaced apart relationship longitudinally of the jaw, said plates each comprising a bight portion and stems extending therefrom, and a pair of spaced apart backing bars secured to the confronting faces of said stems of said plates and bridging the spaces between said plates, against which said chisel guide bars engage.

2. A machine as specified in claim 1 in which said chisel guide bars also engage the bight portions of said plates.

3. A machine as specified in claim 1 in which said means comprises screws extending in threaded engagement through said backing bars and engaging said chisel guide bars.

4. A machine as specified in claim 1 in which said U-shaped plates each have a spacer plate portion rigid with the bight portion thereof, extending in spaced relation between the stems thereof with the confronting faces of said chisel guide bars engaging the sides of said spacer plate portions, whereby some of the chisels are segregated from others by said spacer plate portions.

5. In a masonry material cutting machine of the type including a jaw and a row of side-by-side, independently reciprocable chisels having shanks, the improvement which comprises; a cradle-like support forming an integral part of the jaw, a pair of spaced, parallel chisel guide bars detachably carried by said support and extending longitudinally of the row of chisels with bearing faces of the bars confronting opposite sides of the chisel shanks, and means detachably connecting said bars to said support, said chisel shanks having longitudinally extending grooves open to the faces thereof confronting one of said chisel guide bars, said cradle-like support including a backing bar against which said last mentioned chisel guide bar engages, and said means including screws extending through said backing bar and said chisel guide bar and loosely into said grooves of the chisel shanks.

References Cited in the file of this patent

UNITED STATES PATENTS

| | | |
|---|---|---|
| 2,552,958 | Graham et al. | May 15, 1951 |
| 2,762,359 | Entz | Sept. 11, 1956 |